United States Patent
Pond et al.

(10) Patent No.: US 10,876,905 B1
(45) Date of Patent: Dec. 29, 2020

(54) TRIPLE POINT OF WATER CELL SHIPPING ENHANCEMENTS

(71) Applicants: Stanley Pond, Berthoud, CO (US); Michael Pond, Loveland, CO (US)

(72) Inventors: Stanley Pond, Berthoud, CO (US); Michael Pond, Loveland, CO (US)

(*) Notice: Subject to any disclaimer, the term of this patent is extended or adjusted under 35 U.S.C. 154(b) by 0 days.

(21) Appl. No.: 17/013,627

(22) Filed: Sep. 6, 2020

Related U.S. Application Data

(63) Continuation-in-part of application No. 16/773,664, filed on Jan. 27, 2020, now Pat. No. 10,768,056.

(51) Int. Cl.
  *G01K 15/00* (2006.01)
  *F17C 7/00* (2006.01)
  *B63B 25/16* (2006.01)

(52) U.S. Cl.
  CPC ........... *G01K 15/002* (2013.01); *B63B 25/16* (2013.01); *F17C 7/00* (2013.01); *G01K 15/005* (2013.01); *F17C 2223/0192* (2013.01)

(58) Field of Classification Search
  CPC ...... G01K 15/00; G01K 15/002; G01N 25/14; G01N 27/4175
  See application file for complete search history.

(56) References Cited

U.S. PATENT DOCUMENTS

| | | | | |
|---|---|---|---|---|
| 3,453,864 A | * | 7/1969 | Chiu | G01N 25/18 374/21 |
| 4,523,859 A | * | 6/1985 | Bonnier | G01K 15/00 374/1 |
| 5,003,784 A | * | 4/1991 | Engdahl | B01D 9/04 62/124 |
| 5,219,225 A | * | 6/1993 | Ball | G01K 15/002 374/1 |

(Continued)

FOREIGN PATENT DOCUMENTS

| | | |
|---|---|---|
| CN | 104251750 A | 12/2014 |
| JP | 360006836 A * | 1/1985 |
| JP | 02003279204 A * | 10/2003 |

OTHER PUBLICATIONS

"The Water Triple Point Cell—An Optimal Realization" by John Tavener. Attached file: The_Water_Triple_Point_Cell_An_Optimal_Realization.pdf.

(Continued)

*Primary Examiner* — Gail Kaplan Verbitsky
(74) *Attorney, Agent, or Firm* — Mark V. Loen

(57) ABSTRACT

The disclosed invention is an improved TPW cell design that is designed to provide a method of removing contaminants from the TPW cell water, and improved resistance to breakage in shipping. An additional storage volume provides for transferring the liquid water from the cell body into the storage volume by inverting the cell, followed by a series of rotations. Subsequent distillation of the water into the cell (Continued)

body by a sub-boiling process (with vapor moving through a transfer tube and condensing in the cell body) results in removal of contaminants from the water in the cell body. The upper volume and transfer tube are configured so that transport damage is minimized by storing the liquid water in the storage volume during transport, and preventing any liquid water from moving from the storage volume into the lower cell body regardless of orientation of the cell during shipping.

11 Claims, 8 Drawing Sheets

(56) References Cited

U.S. PATENT DOCUMENTS

| | | | | |
|---|---|---|---|---|
| 6,003,332 A | * | 12/1999 | Foster | C01B 32/55 |
| | | | | 62/601 |
| 6,293,695 B1 | * | 9/2001 | Schmermund | G01K 15/002 |
| | | | | 374/1 |
| 6,324,894 B1 | * | 12/2001 | Kang | G01K 15/002 |
| | | | | 73/25.03 |
| 6,939,035 B2 | | 9/2005 | Machin | |
| 7,677,794 B2 | | 3/2010 | Kim et al. | |
| 7,708,459 B2 | | 5/2010 | Nakano | |
| 7,905,706 B1 | | 3/2011 | Liang | |
| 8,267,575 B2 | | 9/2012 | Tavener | |
| 9,383,124 B2 | * | 7/2016 | Bonnay | G05D 23/1951 |
| 2012/0055874 A1 | * | 3/2012 | Feraud | B01D 11/0476 |
| | | | | 210/638 |
| 2016/0076949 A1 | | 3/2016 | Sabah | |
| 2016/0216223 A1 | * | 7/2016 | Ibarra Covarrubias | |
| | | | | G01M 15/104 |
| 2018/0224338 A1 | | 8/2018 | Umkehrer | |

OTHER PUBLICATIONS

Attached file: Fluke-NIST_TPW.pdf.
Attached file: K29AB_DataSheet_Aug2016.pdf.

\* cited by examiner

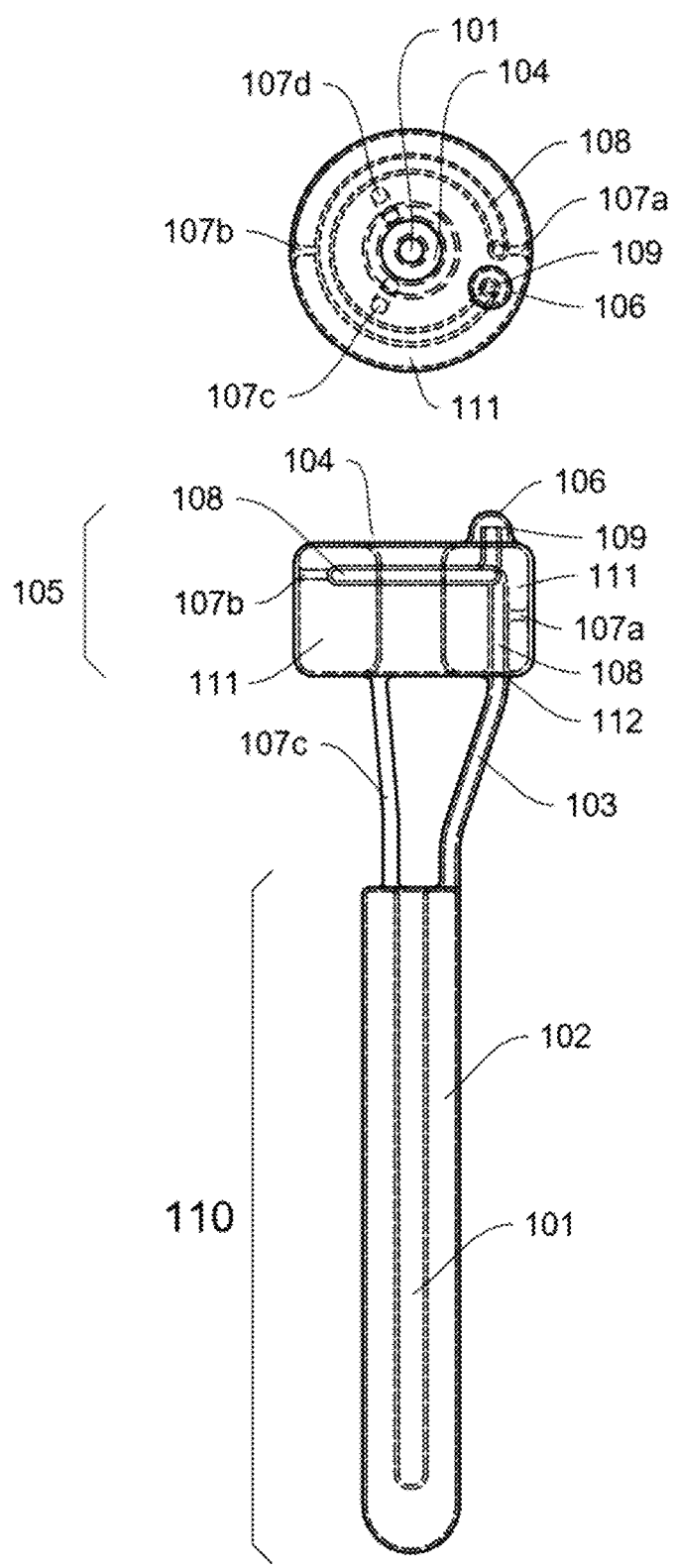

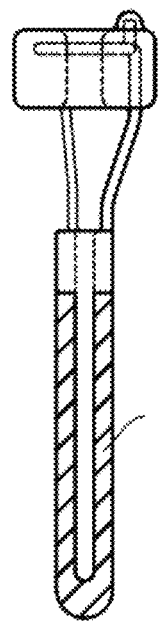 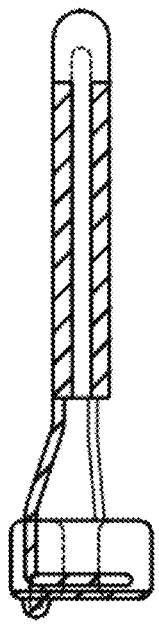 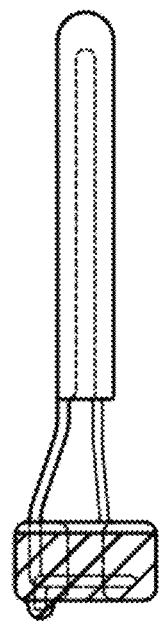
Fig. 3A　　　　Fig. 3B　　　　Fig. 3C
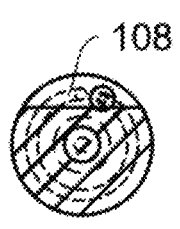 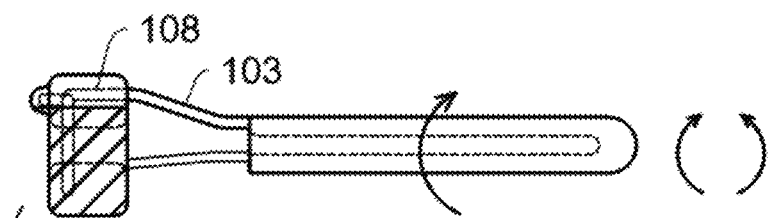
Fig. 3D

TRIPLE POINT OF WATER CELL SHIPPING ENHANCEMENTS

CROSS REFERENCE TO RELATED APPLICATIONS

This application is a continuation in part of U.S. patent application Ser. No. 16/773,664 filed on Jan. 27, 2020. This referenced application is incorporated by reference herein.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION

(1) Field of the Invention

This invention is directed to instrumentation that provides a precise reference temperature for calibration purposes.

(2) Description of Related Art

BACKGROUND

The Triple Point of Water (TPW) is defined as the point at which water exists simultaneously in equilibrium in the liquid, solid, and gaseous states. On the International Temperature Scale of 1990 (Per ITS-90), the Kelvin (K) is defined as 1/273.16 of the temperature of the TPW. The TPW establishes both the pressure and the temperature at which pure water, pure ice, and pure water vapor coexist in a stable equilibrium. This occurs at exactly 273.16 kelvin (0.01° C.) and at an absolute pressure of approximately 4.58 mm Hg.

The TPW serves as the foundation of modern temperature scales and TPW cells establish a close approximation of this defining fixed point for practical thermometer calibration in metrology laboratories around the world at the primary level (lowest temperature uncertainty available). Commercially available TPW cells can be used to realize the triple point of water with an uncertainty of better than 0.1 millikelvin (mK). Most TPW cells are constructed in one of two styles with dimensions and geometry commonly referred to as "Type A" or "Type B". The Type A design was originally developed by the US National Institute for Standards and Technology (NIST—formerly National Bureau of Standards) and the Type B design originated with the National Research Council (NRC) in Canada. Both types are very similar in design and operation and cells of both types are currently commercially produced by several manufacturers.

The disclosure and explanation of commercial TPW cells is explained in the background disclosure of U.S. patent application Ser. No. 16/773,664 filed on Jan. 27, 2020, and may be read for a deeper understanding.

It is necessary to fill the cell with a high purity, highly degassed water. Also, the cell geometry is a relatively long slender cell body and includes a reentrant well. This design provides the needed immersion depth necessary for precision calibration of Standard Platinum Resistance Thermometers (SPRT's).

Unfortunately, the ability of water contained in (and moving within) the glass TPW cell envelope to create a "water hammer" is remarkable and somewhat non-intuitive. A water hammer in a TPW cell is a particular problem in shipping, because sudden package movement during shipping can cause the liquid water inside the glass cell envelope to create a water hammer resulting in high stress in the glass envelope with a high probability of glass envelope breakage. The liquid water in the cell envelope is able to rapidly move as a column of liquid water, and is un-impeded due to the highly degassed water in the cell and the lack of any significant dampening. The glass cell body, and any associated tubing, is liable to breakage as the glass tubing is relatively brittle and relatively weak in tension.

More technically speaking, the dominant mechanism of breakage of TPW cells during shipping (or improper handling during use) is due to rapid (vertical or horizontal) movement of the cell body in a direction parallel to the long axis of the cell, resulting in the formation of a gas bubble (primarily very low pressure water vapor) at one end of the cell and the collapse of gas at the opposing end of the cell. Subsequent movement of the cell in the opposite direction causes the gas bubble to rapidly collapse under the hydrostatic head of the liquid water above it or other movement opposing the first. The resulting rapid stop of the column of liquid water as it makes contact with the wall of the cell envelope creates a water hammer and can generate sufficiently high pressure to rupture the glass envelope. Acceleration and displacement magnitudes experienced by packages being transported by available package delivery services are sufficient to cause breakage by this mechanism.

Shipping TPW cells is unique as no amount of external packaging will provide the needed cushioning to protect the cell from breakage, as it will not stop water hammer inside the cell. Typical breakage rates of TPW cells have exceeded 50% during shipping. For many years TPW cells were hand carried on commercial aircraft to avoid breakage. However, this has become difficult to arrange due to restrictions associated with transport of any liquid contained in a glass container aboard commercial aircraft since 9/11.

There have been efforts to ship TPW cells without breakage including:

1. Carefully freezing the water in a Type A or Type B cell to form a completely solid unit, preventing the movement of water that creates water hammer. Limited success has been achieved with this method. However, freezing all the water in the cell without cracking the glass envelope has been difficult and shipping must be accomplished without allowing the ice to melt.
2. Breakage has been reportedly reduced by one manufacturer by shipping multiple cells at a time in a special container which holds the cells with their long axis oriented approximately 45 degrees off vertical. Unfortunately, even with this approach, breakage rates approaching 50% have still been experienced.

There is a clear need in the marketplace for a TPW cell design that minimizes or eliminates the propensity to form water hammers, while still providing a long cell life. This is highly desirable from a replacement cost standpoint, as well as providing the ability to transport a cell allowing traceability to national/international standards and historical trend analysis without losing use of the cell due to breakage in shipping.

It is known that shipping instructions such as "this side up" are frequently ignored during shipping. This requires a design that will accommodate a variety of positions during shipping and still offer breakage protection.

There is also a need in the marketplace for a TPW cell that allows removal of impurities from the TPW cell water while maintaining a robust easily manipulated form.

BRIEF SUMMARY OF THE INVENTION

The invention is a two connected volume, compact, nominally coaxial TPW cell design that provides a method to remove contaminants from the TPW cell water. An upper volume provides a mechanism for transferring substantially all of the liquid water from the cell body and isolating the liquid water in the upper volume by inverting the cell (draining the water by gravity) followed by a series of rotations. Subsequent distillation of the water into the cell body by a sub-boiling process (with vapor moving through the transfer tube and condensing in the cell body) results in removal of contaminants from the water in the cell body.

The upper volume, cell body and transfer tube are configured so that transport damage is minimized by providing the ability to sequester the liquid water in the upper chamber during transport, and preventing the upper chamber water from moving into the lower cell body regardless of package orientation during shipping.

BRIEF DESCRIPTION OF THE SEVERAL VIEWS OF THE DRAWING(S)

FIGS. 1A-1C show a front, top, and side view of the embodied TPW Cell with a connected, nominally coaxial volume with an annular chamber.

FIGS. 3A-3E show how the embodied invention is manipulated and rotated so as to allow the TPW cell water to move into an upper annular chamber.

DETAILED DESCRIPTION OF THE INVENTION

Figure 1C:
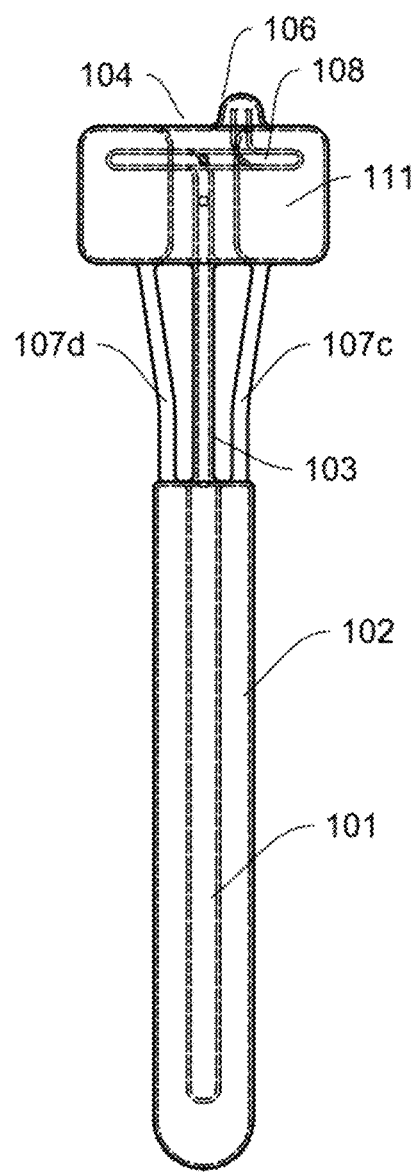

The figure parts include:
101 Re-Entrant Well (use to calibrate temperature sensor)
102 TPW Cell body volume (TPW Cell)
103 Lower Transfer Tube Section (Water-Vapor)
104 Annular Ring Opening (Chamber)
105 Upper Annular Volume Assembly (retains water Contaminants) or storage volume assembly
106 Dome
107a,b,c,d Support Rod
108 Upper Transfer Tube Section
109 Terminal End of Upper Transfer Tube Section
110 Triple Point Water Cell Body
111 Annular volume or storage volume
112 Entry End of Upper Transfer Tube Section
201 TPW Cell Assembly
202 Bubbler Pump with bubbler stone
203 Peltier Solid State Cooler
204 Insulated Tank
205 Temperature measurement
206 Coolant Fluid
207 Temperature Sensor being calibrated
301 Cell water liquid (purified water)
302 Cell water vapor
303 Cell cooling
304 Liquid Fee Surface Level (visual water level)
401 Wrap angle
402 Liquid Fee Surface Level (visual water level)
403 Entry position of transfer tube
404 End position of transfer tube
405 Water Vapor Gap
406 Entry position of transfer tube
407 Exit position of transfer tube
408 Wrap angle
409 Liquid Fee Surface Level (visual water level)
501 Transfer Tube
502 Support Tube Key to the design and resulting improvement in shipability of the TPW Cell is the location of a reservoir having an aspect ratio (ratio of diameter to length) much closer to unity than the cell body above and connected to the cell body by a transfer tube having a geometry allowing the liquid water to be sequestered in the reservoir. During Shipment, the cell water (purified liquid) is sequestered in the upper volume which has a geometry more closely approximating a sphere than the long, slender cylindrical body of the TPW cell, eliminating the long cylindrical column of liquid water prone to generate destructive water hammers.

The transfer tube allows vapor movement from the upper volume to the cell body during distillation. Additionally, the transfer tube is designed to allow decanting virtually all of the liquid water from the cell body into the upper volume by inverting the cell, by orienting the cell axis horizontally and rotating the cell.

Constructing the transfer tube at the top of the storage volume with nearly a full 360 degree turn results in an improved geometry which does not allow movement of liquid water from the storage volume to the cell body regardless of the orientation of the cell during transport.

Testing of a TPW Cell so configured for transport (with substantially all of the liquid water contained in the upper storage volume) produced no hydrostatic hammer with even fairly violent movement of the cell. Additionally, no substantial transfer of liquid water from the storage volume to the cell body was observed regardless of the orientation of the cell. It is important to note that movement of a significant volume of water from the storage volume to the cell body will only occur when there is a substantial temperature gradient between the storage volume and the cell body. Since substantial temperature gradients are extremely unlikely during shipment, the cell is protected from damage during shipment with normal good packaging practices.

The cell can be readied for use by placing the cell body (with the long axis of the cell body nominally oriented vertically) into a cooled environment while the upper volume remains nominally at room temperature causing water vapor to move to the cell body and condense, distilling the water with no active boiling.

The embodied dual connected volume design provides the ability to transfer substantially all of the liquid water contained in the cell into the upper annual volume and isolate the liquid water subsequently distilling the water into the cell body by sub-boiling vaporization in the upper annular volume and condensation of the water in the cell body volume.

As seen in FIGS. 1A-1C, the embodied invention is a TPW cell body 110 that is connected to an upper annular volume assembly 105 by a transfer tube 103 and supporting rods 107c,d. The cell body comprises an inner re-entrant well 101 tube that is primarily used for thermometer calibration, and a cell body volume 102 surrounded by an outer tube. An annular ring opening 104 provides for insertion of a temperature sensor into the re-entrant well 101.

A lower transfer tube 103 is connected to an upper transfer tube 108 that is extended into the upper annular volume 111 at entry point 112. Importantly, the upper transfer tube has sufficient wrap angle (or rotation in the upper annular volume from the entrance point to the dome) to ensure that both ends of the wrap cannot be lower than the liquid free surface at the same time. The lower and upper transfer tubes connect the cell body volume 101 and the upper annular volume 111. In this embodiment, the upper transfer tube end 109 is added to the end of the upper transfer tube which terminates under a dome 106. The dome 106 provides a small additional volume to the annular volume 111. Ultimately, the transfer tubes (lower, upper, and dome) end above the liquid free surface level of the water in the annular volume 111.

This design provides a carefully designed route for the liquid water in the upper annular volume to flow into the cell body volume, and it prevents a significant amount of water from transferring during typical shipping movements and positions. Even if some liquid does transfer, as much as ⅓ of the water could be transferred, without significantly reducing the ability to prevent breakage.

The upper annular volume is far more resistant to the formation of water hammers, as liquid movement is significantly constrained. It is important that the design includes a fill volume, associated free surface level, and a suitable transfer tube wrap angle in the upper annular volume.

Support rods 107a,b are added to stabilize and support the transfer tube within the annular volume 111.

An important design feature of the embodied TPW cell is the location of a water reservoir volume 111 in the shape of an annular ring above and nominally concentric with the long axis of the cell body 110. The annular ring volume is connected to the cell body volume by the transfer tubes 103,108,109 which provides the ability for water movement between the two volumes. Liquid water is transferred from the cell body volume to the annular ring volume by inverting the cell and draining the liquid water into the annular volume. Rotation of the cell in multiple axes then isolates the liquid water in the annular volume. Submerging the cell body in a cooled maintenance bath while the annular volume remains in room ambient temperature conditions causes a vapor pressure difference between the two volumes and results in vapor movement from the upper volume to the cell body during distillation. This is important for purifying the cell body water during a periodic renewal.

The annular volume is a preferred shape. However, other storage shapes with or without a central opening could be used.

Figure 2:
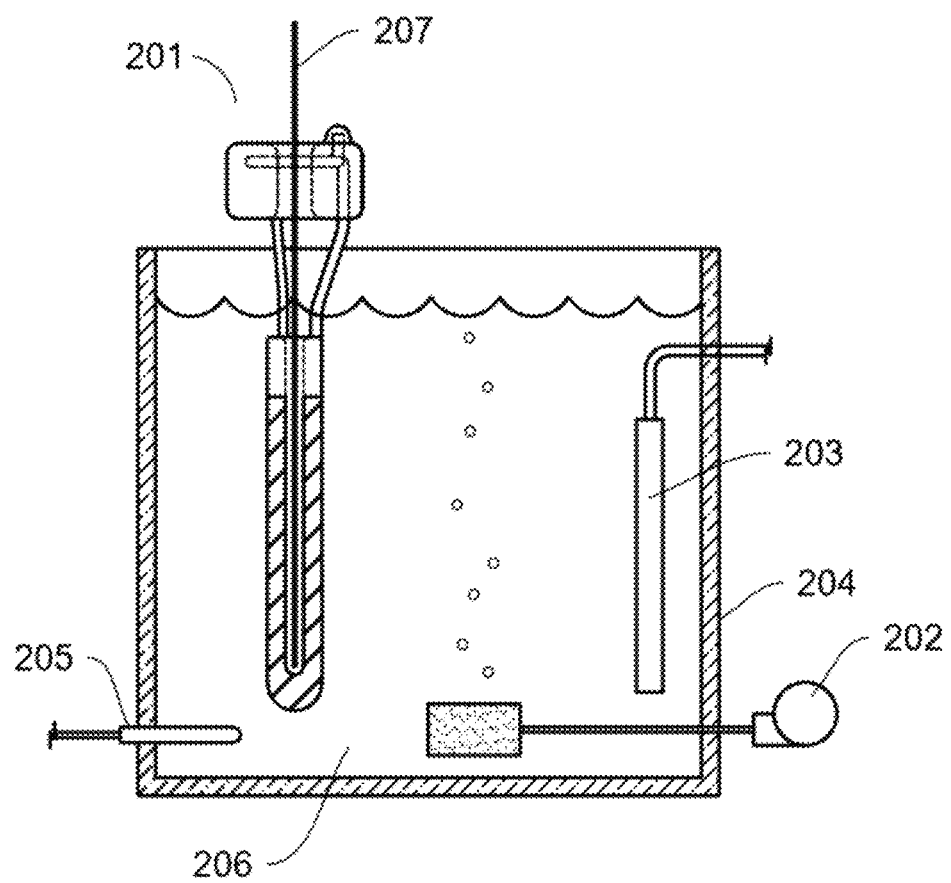
FIG. 2 shows the improved TPW cell in a maintenance bath set up to maintain the ice mantle.

FIG. 2 shows a schematic representation of a typical TPW cell in a maintenance bath. A TPW cell 201 (as shown in FIGS. 1A-1C) is submerged in the maintenance bath fluid 206 which is a water antifreeze mix contained in an insulated tank 204. The bath fluid temperature as measured by temperature sensor 205 is maintained at a constant 0.007° C. The bath fluid is agitated by stirring or an air bubbling/pump system 202 to avoid temperature gradients in the maintenance bath 206. A Peltier solid state cooling module 203 is utilized to provide cooling in the tank. As illustrated, a temperature sensor 207 is positioned in the re-entrant well of the TPW cell for calibration of the temperature sensor. Conveniently, the temperature sensor being calibrated passes through the annular ring opening for calibration.

Normally, the TPW cell remains in the maintenance bath while the TPW is being realized. Multiple thermometers may be calibrated using a TPW cell as long as the mantle remains adequately formed and is free to rotate about the re-entrant well.

Figure 3E:
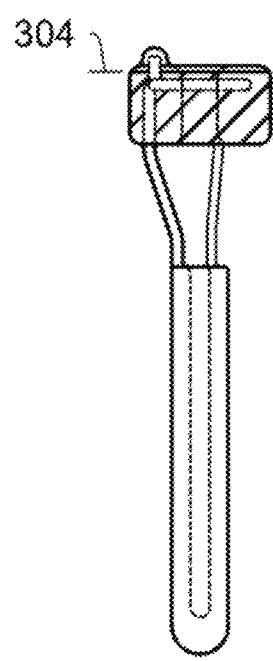

As seen in FIGS. 3A-3E, the TPW cell water 301 is purified by a transfer into the annular volume and isolated in the annular volume by a sequence of rotations as illustrated. In order to minimize vapor pressure differences and their interference with the process described, the cell should be uniformly near room ambient temperature during the start of this process. Since there is virtually no air in the cell body volume or the annular volume, the water easily flows through the transfer tube with little resistance. The rotation markings for FIG. 3D show an axial rotation with a center line, and an out of plane (out of paper plane) rotation with a small circle. All rotations are performed with the TPW cell removed from the maintenance bath.

To start, as shown in FIG. 3A, the TPW cell is rotated about 180 degrees (FIG. 3B) and the cell water is allowed to completely drain into the upper annular volume (FIG. 3C). The TPW cell is then rotated about 90 degrees so that the cell liquid water is completely drained out of the lower transfer tube 103 and into the annular volume.

The upper transfer tube 108 is then drained by rotating the cell about the long axis as needed and rotated end to end as seen in FIG. 3E to completely drain any cell liquid water into the upper annular volume. Preferably, the annular volume is tipped slightly downward or upward as needed to complete the water transfer with all the liquid water in transfer tube 108, 109 substantially transferred into the annular volume. This is readily done visually by watching the movement of the water into the annular volume. Any water wetting or stray drops remaining on the transfer tube or cell body volume is insignificant.

Figure 3F:
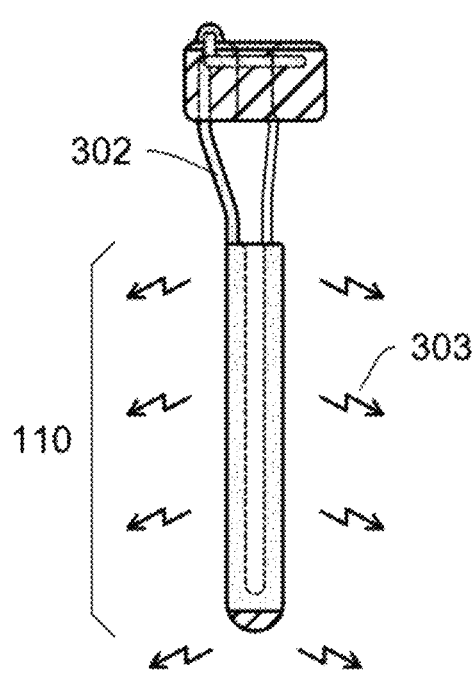
FIGS. 3F-3G show the TPW cell water sub boiling back to the TPW cell body.

The cell is then rotated CW to vertical (FIG. 3E). In FIG. 3F, the cell is placed in a maintenance bath which removes heat 303 from the lower cell body 110 while the annular volume remains above the maintenance bath, nominally at room ambient temperature.

Notably, the liquid free surface level 304 is indicated. The exact level point is based on the fill volume of the cell body and the size of the annular volume.

Figure 3G:
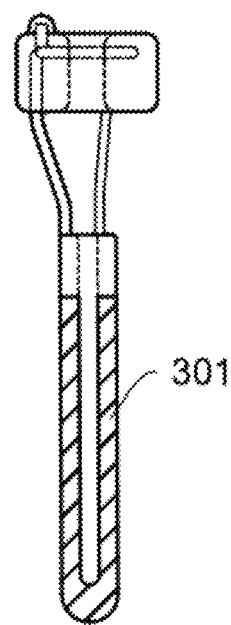

In FIGS. 3F-3G the TPW cell water vapor 302 transfers back into the cell body by sub boiling vaporization in the upper annular volume and condensation in the cooled cell body 303. The cell body cooling lowers the pressure in the cell body volume, and the cell water vapor slowly flows to the cell body and condenses to a liquid with the complete volume of liquid water 301 being transferred to the cell body in a day or so. The contaminants formerly in the cell body water remain in the upper annular volume.

The upper transfer tube routing can vary as well as the placement and size of the dome on top of the annular volume, relative to the transfer tube entry into the annular volume. Preferably, the dome is on top of the annular volume and near the outer perimeter.

Figure 4A:
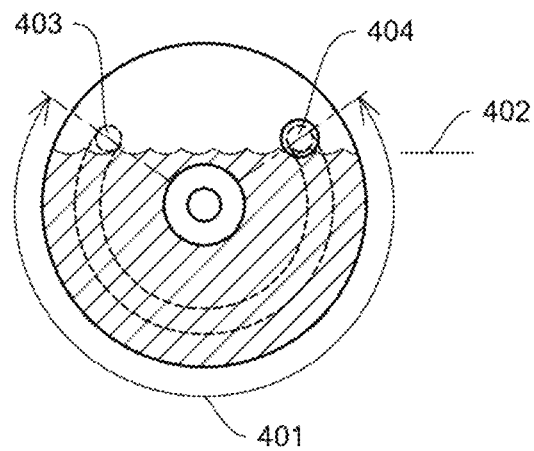
FIGS. 4A-4D show the necessary wrap angle of the transfer tube in the annular volume as it relates to the liquid free surface level allowing it to provide the ability to sequester the liquid water in the upper volume regardless of orientation during shipping.

FIG. 4A shows the end view of the annular chamber when the cell body is horizontal. The entry position of the transfer tube 403 and the end position/dome 404 are indicated. In this case, the liquid free surface level 402 (or visual water level) is minimally filling the annular chamber. The arc angle 401 is used to prevent transfer of water between the annular chamber volume and the cell body. The angle is minimized by ensuring that the entry and exit positions of the transfer tube are above the free surface level when in the position shown. As illustrated, the arc angle is 250 degrees, but any angle greater than 180 degrees would still be an improvement, depending upon the annular volume design, amount of liquid fill, and positioning of the transfer tube in the annular volume. If there is not enough of an arc angle, it is possible to orient the cell body/annular chamber in a way that allows transfer of liquid into the cell body.

Figure 4B:
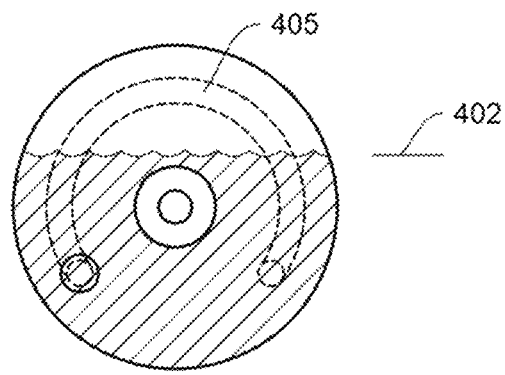

FIG. 4B shows the end view when rotated 180 degrees, and the liquid level is substantially the same position. In this case, the entry and end positions of the upper transfer tube are below the free surface level 402. However, the vapor pocket 405 in the radial arc portion of the transfer tube prevents any significant liquid flow by gravity from the annular volume back into the cell body, regardless of how the cell body/annular chamber are oriented. It is recognized that rotation of the cell along its long axis has the potential to transfer a small volume of liquid water (nominally the volume of the curved section of the transfer tube) with each full revolution. Since this motion is very unlikely to be experienced in shipping, this is not seen as a difficulty.

Figure 4C:
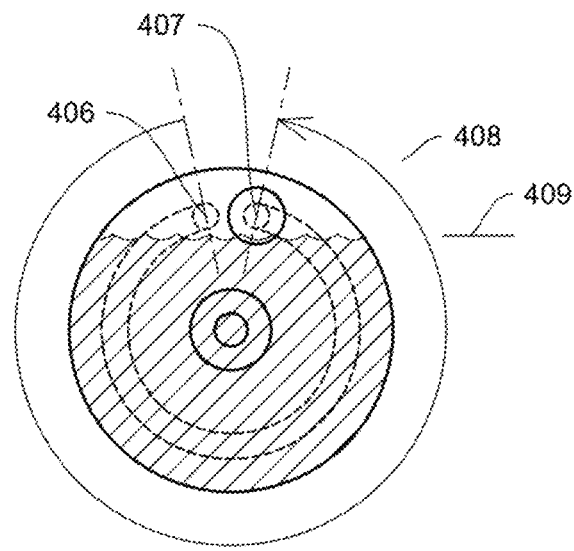
Figure 4D:
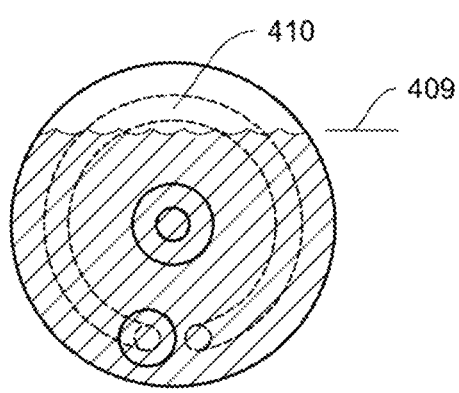

In FIG. 4C, the radial arc portion of the upper transfer tube is routed from a beginning point 407 to an ending 406 with an overall angle 408 of about 335 degrees. FIG. 4D shows the gap 410 in this case. It is preferable to have a large arc angle and the liquid free surface level is as high as possible for best equipment use and stability. An arc angle of 350 degrees or higher is more preferred, as it will allow the necessary volume of water to be stored in the smallest annular chamber physical size.

In designing the annular volume and transfer tube, part of the consideration is the ease of manufacture and part consideration of protecting the upper transfer tube from damage during shipping. For example, the upper transfer tube uses curves over sharp corners as it will be stronger. Also, the position of the dome on the annular volume is more easily positioned near the perimeter rather than on the perimeter. Also, internal support rods are better if they are shorter.

In general, the transfer tube is arranged to allow decanting virtually all of the liquid water from the cell body into the upper volume when inverting the cell and then orienting the cell long axis horizontally and rotating the cell around the long axis. Realizations of the TPW with water distilled back into the cell are free from the influence of contaminants which remain in the annular volume.

Optionally, liquid water can be moved (decanted as opposed to distilled) from the annular volume directly into the cell body volume by placing the inverted cell into a warm bath enveloping the upper volume. This causes an increase in vapor pressure in the annular volume which moves the liquid water into the cell body volume. Maintaining the position of the transfer tube end 109 below the liquid free surface of the water in the annular volume and slowly rotating the cell to a nearly horizontal orientation is important during this process. It decreases the hydrostatic head of the liquid water in the cell body volume which allows transfer of substantially all of the liquid water (and contaminants) into the cell body volume. Realization of the TPW with the decanted water will contain contaminants leached from the glass envelope over time, providing a method of quantifying the level of contamination which has taken place over the life of the cell.

For shipping a cell of this design, standard packaging can be used such as a cut foam insert (or foam in place cushioning) in an appropriately sized fiberboard box. Use of an overpack box with additional cushioning may or may not be necessary. Any preference or benefit associated with package orientation is minimal.

It is important to note that the volume per length of the cell body is less than the volume per length of the annular chamber. Water hammer generation is reduced or eliminated in the annular chamber because there is not a water column with sufficient length to generate a significant water hammer as a result of movement during a sudden stop or lurching during shipping.

Figure 5A:
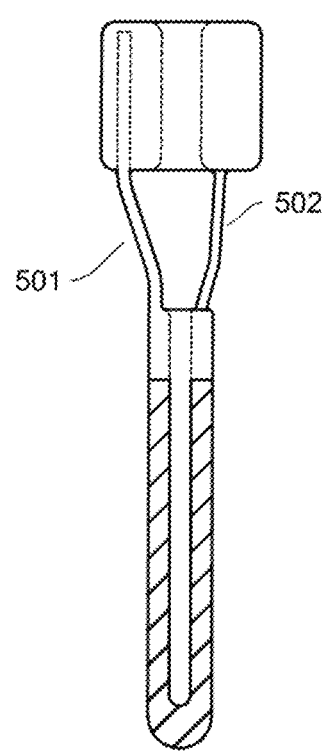
FIGS. 5A-5B show the TPW cell with annular chamber in an alternate embodiment.
Figure 5B:
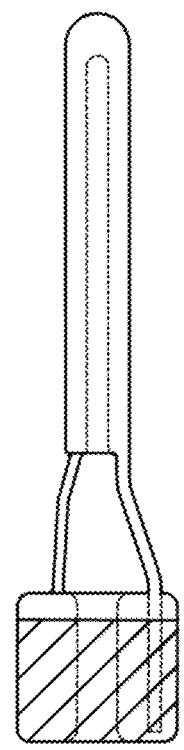

In an alternate embodiment, the transfer tube routing in the annular chamber can be simplified if the TPW cell and annular chamber can be shipped in the preferred shipping position. In this case, the transfer tube 501 merely has to terminate above the liquid free surface of the water when in normal use (oriented with the storage chamber above the cell) as shown in FIG. 5A. Support tubing 502 between the storage chamber and the cell body is shown. The shipping position is shown in FIG. 5B.

While various embodiments of the present invention have been described, the invention may be modified and adapted to various operational methods to those skilled in the art. Therefore, this invention is not limited to the description and figures shown herein, and includes all such embodiments, changes, and modifications that are encompassed by the scope of the claims.

We claim:

1. A triple point of water cell designed for reduced shipping breakage comprising:
   a) a cell body used for realization of the triple point of water for thermometer calibration having a cell body volume,
   b) a storage volume having a central opening,
   c) said central opening substantially coaxially aligned to said cell body,
   d) a transfer tube connected between said cell body volume and said storage volume,
   e) said transfer tube further comprising:
      i) a lower tube section connected between said cell body volume and an entry of said storage volume,
      ii) an upper tube section connected to said lower tube section, and
      iii) said upper tube section is circumferentially routed inside said storage volume with an arc angle greater than 180 degrees, and
   f) said transfer tube is configured to transfer purified water between said cell body volume and said storage volume, and
   g) said purified water is substantially positioned in said storage volume prior to shipping.

2. The triple point of water cell according to claim 1, further comprising:
   a) a dome attached to said storage volume,
   b) said dome having an additional volume connected to said storage volume,
   c) said dome positioned above a water liquid free surface level, and
   d) said transfer tube is additionally routed to said additional volume.

3. The triple point of water cell according to claim 2, wherein said central opening is substantially shaped as a cylinder.

4. The triple point of water cell according to claim 3, wherein said dome is positioned on a top surface of said storage volume, wherein said storage volume has an annular volume geometry.

5. The triple point of water cell according to claim 1, wherein at least one support rod is connected between said cell body and said storage volume.

6. The triple point of water cell according to claim 1, wherein at least one support rod is connected between said upper tube section and said storage volume.

7. The triple point of water cell according to claim 1, wherein said upper tube section is routed in an arc of at least 190 degrees inside said storage volume.

8. The triple point of water cell according to claim 1, wherein said purified water is contained inside a connected volume comprising said cell body volume, said transfer tube, and said storage volume.

9. The triple point of water cell according to claim 1, wherein an entry end of said upper tube section and a terminal end of said upper tube section within said storage volume are above a liquid free surface level of said storage volume when said cell body is oriented horizontal.

10. A triple point of water cell designed for reduced breakage during shipping comprising:
   a) a cell body used for realization of the triple point of water for thermometer calibration having a cell body volume,
   b) an upper annular chamber having a storage volume and a central opening,
   c) said central opening substantially coaxially aligned to said cell body,
   d) a transfer tube connected between said cell body volume and said storage volume,
   e) purified water residing within a connected volume of said cell body volume, said transfer tube, and said storage volume, and
   f) said purified water is substantially positioned in said storage volume prior to shipping.

11. A triple point of water cell designed for reduced breakage during shipping comprising:
   a) an elongated triple point of water cell body having an elongated cell body volume, said elongated cell body volume having a first volume per unit length,
   b) a storage volume having a central opening, said storage volume having a second volume per unit length,
   c) said second volume per unit length is greater than said first volume per unit length,
   d) a transfer tube that connects said elongated cell body volume and said storage volume,
   e) said transfer tube having an arc shape within said storage volume,
   f) purified water residing within a connected volume of said elongated cell body volume, said transfer tube, and said storage volume, and
   g) whereby purified water is substantially sequestered in said storage volume regardless of orientation during shipping.

* * * * *